United States Patent

[11] 3,564,204

| | | |
|---|---|---|
| [72] | Inventor | Heinz Mense<br>Berlin, Germany |
| [21] | Appl. No. | 644,016 |
| [22] | Filed | June 6, 1967 |
| [45] | Patented | Feb. 16, 1971 |
| [73] | Assignee | Siemens Aktiengesellschaft<br>Berlin and Munich, Germany |
| [32] | Priority | June 6, 1966 |
| [33] | | Germany |
| [31] | | S104,203, S104,204 |

[54] APPARATUS FOR CONTROLLING THE HEATING CURRENT FOR WELDING THERMOPLASTIC SYNTHETICS
14 Claims, 10 Drawing Figs.

[52] U.S. Cl. .................................................. 219/497
[51] Int. Cl. ................................................... H05b 1/02
[50] Field of Search .......................................... 219/497,
501, 502; 317/148.5

[56] References Cited
UNITED STATES PATENTS
2,978,630 4/1961 De La Tour .................. 323/4
3,381,212 4/1968 Peltola et al. ................. 219/502
2,808,559 10/1957 Engle .......................... 323/21

*Primary Examiner*—Bernard A. Gilheany
*Assistant Examiner*—F.E. Belu
*Attorneys*—Curt M. Avery, Arthur E. Wilfond, Herbert L. Lerner and Daniel J. Tick ABSTRACT: An electrical apparatus for controlling the current used for welding parts of thermoplastic synthetics with the aid of heating wire which is placed between the parts to be joined and is heated by the welding current while sufficient joining pressure is applied. The apparatus regulates heating current at a desired value independently of the energizing voltage and independently of the resistance of the interposed heating wire. For this purpose a voltage is taken from a voltage-drop resistor connected in series with the heating wire and employed for lighting a lamp which illuminates a photoresistor. The resulting variation in voltage at the photoresistor is amplified and used for regulating the welding current. This permits giving the voltage-drop resistor in the circuit of the heating wire an extremely small size thus reducing the power losses. The current regulation is preferably effected in accordance with a predetermined heating program which is automatically monitored in dependence upon the ambient temperature sensed by a thermistor.

APPARATUS FOR CONTROLLING THE HEATING CURRENT FOR WELDING THERMOPLASTIC SYNTHETICS

My invention relates to apparatus for controlling the welding current in the production of welded joints between parts of thermoplastic synthetic materials, such as cable sleeves of polyethylene. In a more particular aspect the invention relates to welding apparatus for joining parts of thermoplastic synthetics with the aid of heater strips, preferably tapes of the same thermoplastic material with embedded heating wires. The welding is done by pressing the parts together under a force sufficient for welding and simultaneously passing through the interposed heater wire an electric current which produces the welding temperature. The heater wire, such as a varnish-coated copper wire, should cover a relatively large heating area between the polyethylene or other thermoplastic parts to be joined together and for this purpose is preferably given a meander-shaped configuration. The wire may be coated with substances which secure or improve it adhesion to polyethylene. The electrical current is passed through the wire for a few minutes to heat the vicinity of the wire to the required welding temperature. After welding the wire remains permanently embedded in the welded seam and can later be used for reheating and thereby opening the seam, for example, for opening a cable sleeve.

Several methods are available for regulating the heating current applied in such a manner. As a rule, the conventional regulating circuits for maintaining a constant current operate by comparing two voltages with each other. A pilot voltage indicative of the current to be regulated is taken from a voltage-drop (IR-drop) resistor which is series connected in the load circuit and thus traversed by the current being regulated and this variable pilot voltage is compared with a reference or datum voltage of substantially constant value. If the current to be regulated has a very high intensity, as is the case with welding equipment of the type described above, the power loss in the series resistor may assume a considerable magnitude to provide for a sufficiently high voltage drop to be tapped off.

It is an object of my invention to devise a regulating apparatus for welding synthetic thermoplastics, particularly by the welding method with interposed heater strips or wires described above, that reduces the power losses and affords a precise regulation at low operating voltages such as 12 volts, for example.

To this end, and in accordance with the invention, I provide a welding control system of the above-described type of with a heating-current regulating device which regulates the current for constant intensity independently of the magnitude of the feed voltage and independently of the resistance of the interposed heater strip or wire member, the heating current being driven by a low feed voltage such as available from a 12-volt storage battery of the type employed in automobiles.

The invention is particularly well suitable for regulating equipment in which the current is maintained at a constant value with the aid of a voltage that is proportional to the regulated current and made available by the voltage drop which this current produces in a series-connected resistor. According to a more specific feature of the invention, the voltage taken off such a series resistor is employed for feeding a light source acting upon a light-sensitive resistance member that forms part of a voltage divider connected to a constant direct voltage; and the magnitude of the current to be regulated is controlled in dependence upon the voltage at the light-sensitive resistance member. This affords giving the series resistor, traversed by the current to be regulated, such a small ohmic dimension that the resulting power loss is extraordinarily small. An accurate regulation is nevertheless secured by virtue of the fact that the use of a light source acting upon a light-sensitive resistance member, has the effect of amplifying the current-responsive pilot voltage.

According to another feature of the invention, it is preferable to have the voltage from the light-sensitive resistance member act upon the base of a regulating transistor which, preferably upon further amplification, triggers the transistors of a control network in the load circuit for thus regulating the load current.

The foregoing and other objects, advantages and features of my invention will be described in the following with reference to an embodiment of apparatus according to the invention, illustrated by way of example in the accompanying drawings, in which.

Figure 3:
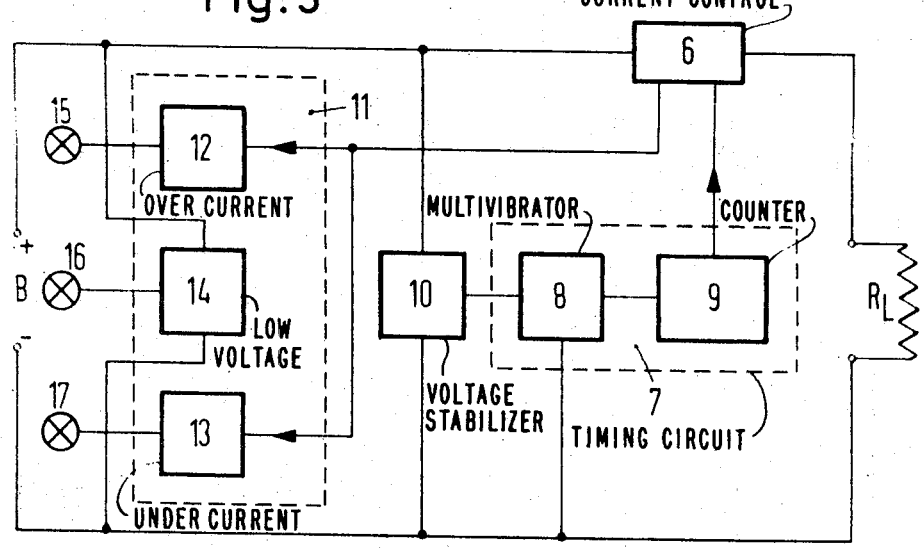
FIG. 3 is a block diagram of a complete control system according to the invention capable of a performance as represented in FIG. 2.
Figure 8:
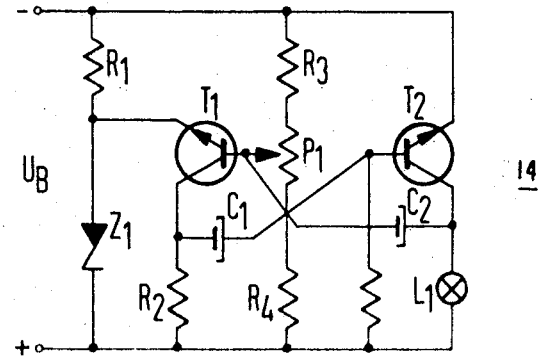

FIG. 8 exemplifies the circuit diagram of a low-voltage control unit applicable to block 14 in FIG. 3.

Figure 9:
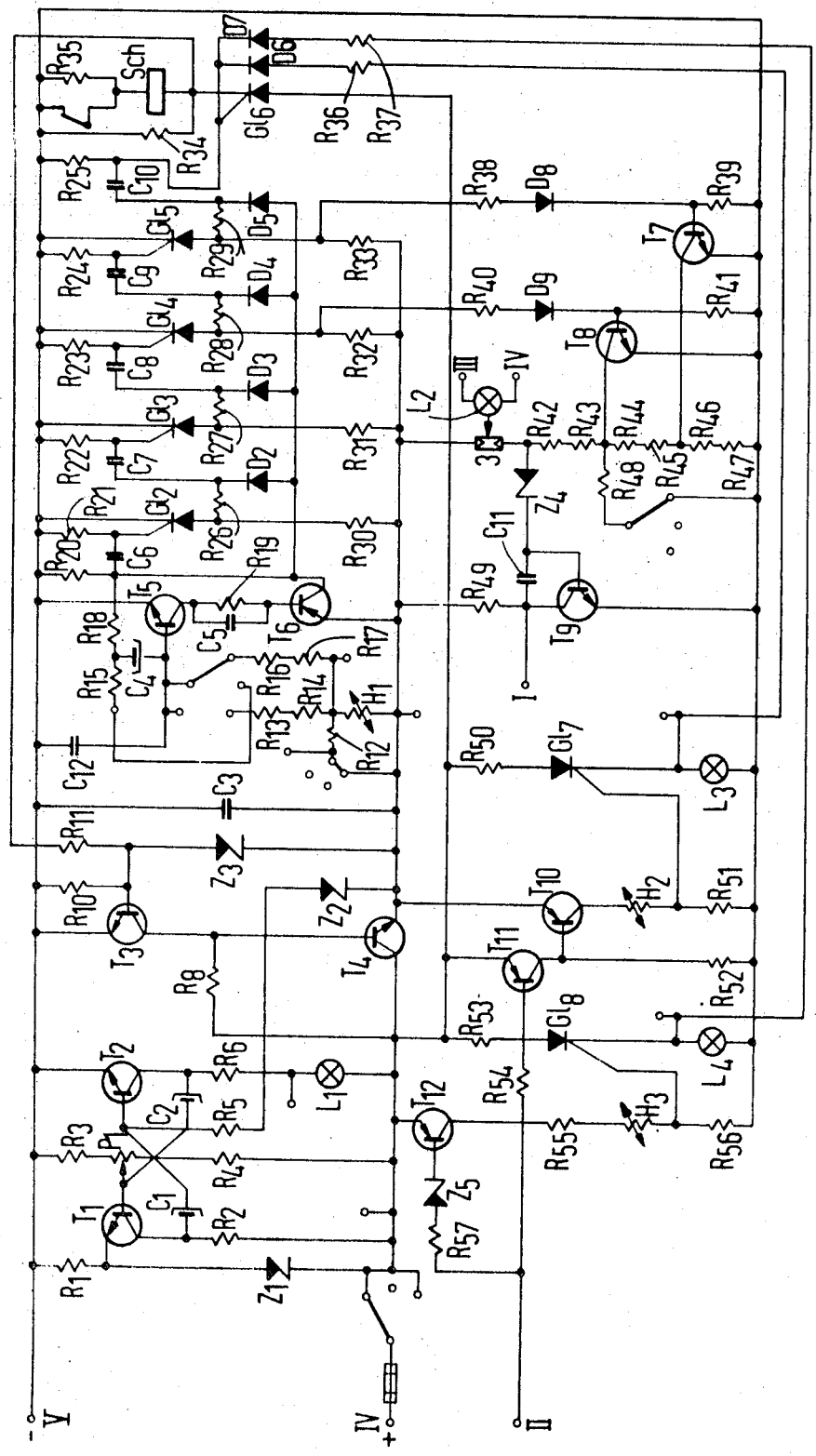

FIG. 9 is a detailed circuit diagram of the control apparatus, including the component circuits of the preceding FIGS.

Figure 10:
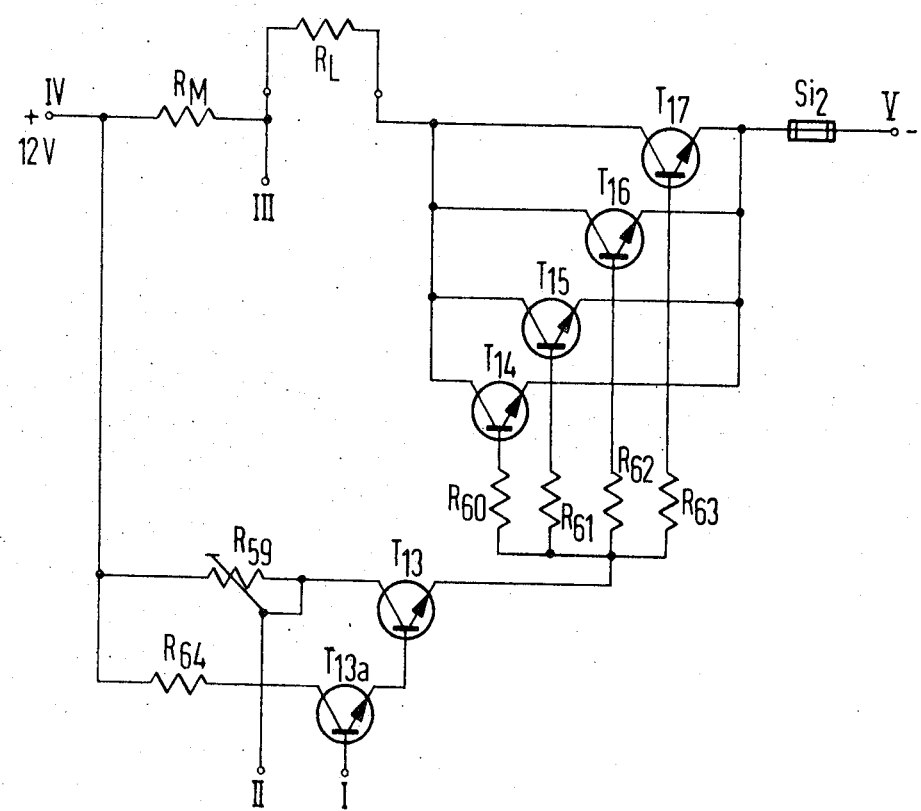

FIG. 10 is the circuit diagram of a regulator network which forms part of the apparatus shown in FIG. 9.

Figure 1:
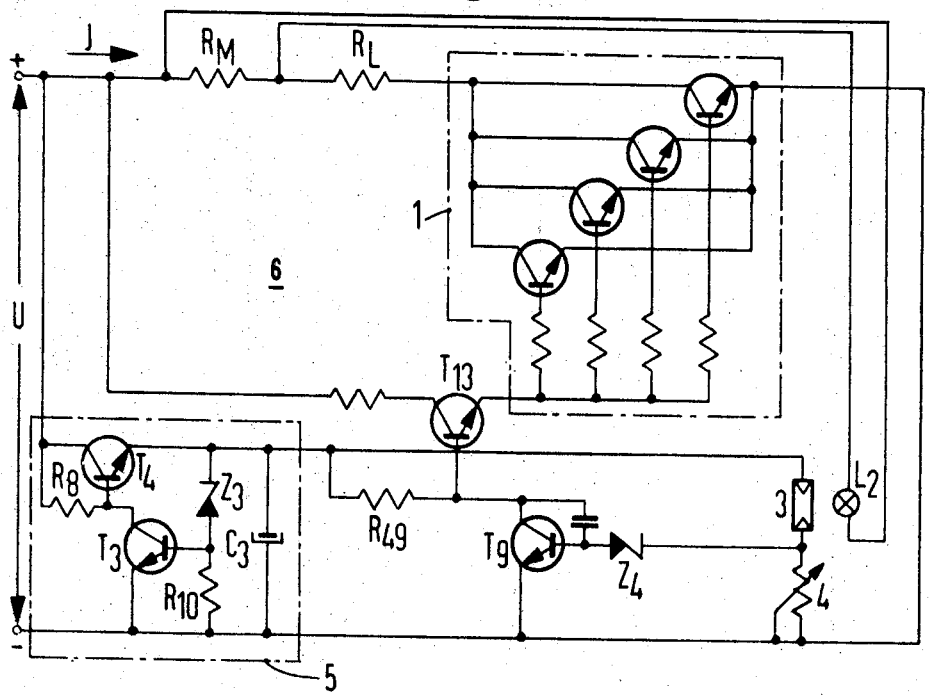
FIG. 1 is the circuit diagram of a control stage for maintaining a constant load current in apparatus according to the invention.

The circuit illustrated in FIG. 1 exemplifies an embodiment of the control means which serve to maintain a constant heating current for the purposes of the invention. The welding load circuit proper comprises the above-mentioned resistance strips or wires which are interposed between the thermoplastic parts to be joined together, these wires being represented by a load resistance $R_L$. The load circuit is energized by direct voltage U applied to the positive (+) and negative (−) bus terminals. The current I flowing in the load circuit is to be kept constant, for example at I=17.5 a. For this purpose a regulating device 1 comprising four parallel-connected transistors is connected in series with the load resistance $R_L$ and in series with a measuring (IR-drop) resistor $R_M$. The voltage drop of resistor $R_M$ is indicative of the intensity of the load current to be regulated. This voltage drop is used for energizing a light source $L_2$ constituted, for example, by an incandescent or glowlamp. The source illuminates a light-sensitive resistor 3 which is connected with a potentiometer rheostat 4 to form therewith a voltage divider energized by constant direct voltage. The direct voltage is furnished from a conventional constant-voltage supply unit 5 composed essentially of two transistors $T_3$, $T_4$ and a Zener diode $Z_3$. The input of unit 5 is connected to the bus terminals (+ and −).

The voltage drop of the photoresistor 3 is applied through a Zener diode $Z_4$ to the base of a regulating transistor $T_9$ which is energized in series with a resistor $R_{49}$ by constant direct voltage from the supply unit 5. The transistor $T_9$ controls through an amplifying transistor $T_{13}$ the regulating unit 1 which maintains the load current I constant.

By virtue of the above-described control stage the resistor $R_M$ can be given such extremely small electrical dimensions that its voltage drop is in the order of no more than about 0.7v. With the welding current of I=17.5 a., the power loss in the measuring resistor $R_M$ thus amounts to as little as 12.6 w. The insensitivity of the control network with respect to changes in temperature depends largely upon a suitable choice of the diode $Z_4$ and the photoresistor 3.

According to further features of my invention, I provide the apparatus for controlling the welding current with time-switching means that monitor the current regulating device in accordance with a desired timing program, namely in such a manner that the intensity of the heating current is reduced incrementally in accordance with the program predetermined by the time switching means, so that the current stepwise assumes smaller values and is preferably switched off at the termination of the welding operation.

To achieve such a performance and in accordance with another feature of my invention, the apparatus for controlling the heating current preferably comprises a multivibrator that determines the timing or keying of the performance, and a counter network controlled by the multivibrator and determining with the aid of the current-regulating network proper the amount of the current flowing through the heater wire employed for the welding operation.

As a result, the apparatus according to the invention is converted to a monitored device which supplies to the welding seam the required quantity of heat in accordance with an empirically ascertained program. This type of control is based upon the consideration that the satisfactory welding of synthetic plastics requires the supply of a given heat quantity, which is a magnitude that follows the law $I^2R$ for a given resistance R per unit length of a uniformly built-up heater wire and consequently requires only determining and controlling the current I. That is, the control of the welding operation becomes substantially independent of the length of the heater wire employed and thus also independent of the size of any individual cables and cable sleeves to which the welding apparatus may be applied. The influence of ambient temperature is taken into account by respectively different heating periods.

Another object of my invention is to secure a welding program in which the heating current is switched in given intervals of time from one to the next value of it incremental progression. Within each interval, preferably determined by sample testing, the welding apparatus can thus be equipped to maintain the current in the heating wire or strip, for example a meander-shaped and embedded wire, at a constant value and to then vary this value stepwise so as to secure an approximately constant welding temperature.

Figure 2:
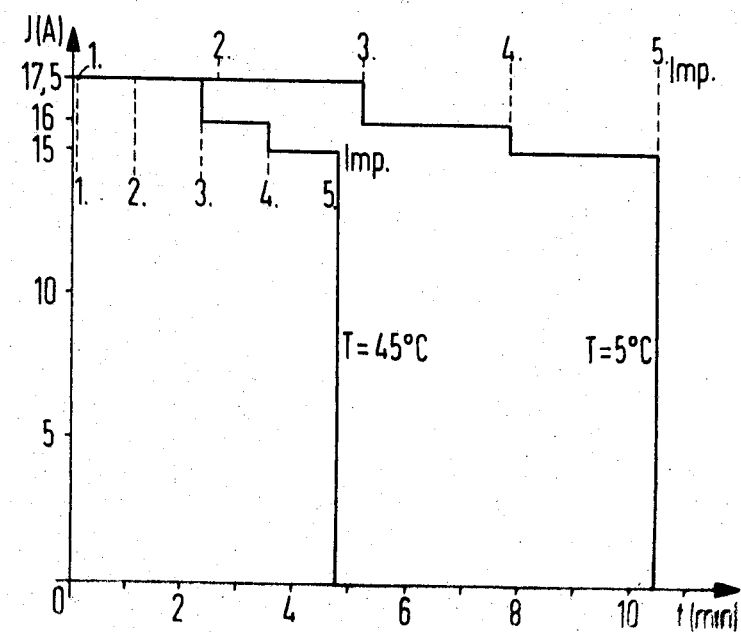
FIG. 2 is an explanatory performance diagram.

Such programmed welding operations are exemplified by the diagram of FIG. 2 in which the abscissa denotes time $t$ in minutes and the ordinate denotes current I in amps. The diagram is shown for ambient temperatures of T=45° C. and T=5° C. Each welding program is performed, for example and as shown in FIG. 2, in five time steps 1.., 2.., 3.., 4.. and 5.. These steps are determined by corresponding pulses Nos. 1 through 5. The pulses are supplied from a keying stage described in a later place. At the beginning of the operation, the heating current is 17.5 a. In both illustrated programs, that is, for the ambient temperature T=45° C. as well as for the ambient temperature T=5° C., this current of 17.5 a. is to remain constant up to the third step and hence up to occurrence of pulse No. 3. Upon elapse of one-half of the total welding time, and consequently with the occurrence of the third pulse, the next current step of 16 a. is to be switched on. After a further time step and hence with the occurrence of the fourth pulse, the current is to be switched down to 15 a. In the welding program for T=45° C., the fifth pulse follows after about 4.8 minutes; and in the program for T=5° C. it follows after about 10.5 minutes. At these moments the control program is at an end and the heating current is switched off.

The monitored control of the heating current exemplified by FIG. 2 takes care that the welding locality, after being rapidly heated initially, will not thereafter become overheated.

The control apparatus schematically shown in FIG. 3 operates in the manner just described. The apparatus comprises as an essential constituent a current control stage 6 which corresponds to a one shown in detail in FIG. 1 and described above.

Another essential constituent of the apparatus according to FIG. 3 is a timing circuit 7 which controls the sequence of the current switching operations applied to the heating current flowing through the heater wire represented by a load resistance $R_L$. The timing circuit comprises an astable multivibrator 6 as timing or keying device, and a counter network which sequentially actuates five switching steps by pulses furnished from the multivibrator 8. The switching of the current from one to another intensity takes place in accordance with a chosen program such as those exemplified in FIG. 2. After each third, fourth and fifth multivibrator pulse, a change is imposed upon the heating current I in the circuit of the load resistor $R_L$. The time spacing of the pulses is varied automatically and continuously in response to changes in ambient temperatures with the aid of a thermistor mounted on the apparatus and effective within the desired temperature range, for example from +5° C. to +45° C. The welding control apparatus is connected to a battery B. It comprises a device 10 for voltage stabilization which supplies constant voltage to the timing circuit 7. A supervisory stage 11 comprises three supervisory control devices 12, 13 and 14. The device 12 serves to check for overload current in the heating resistor $R_L$. The device 13 supervises for undercurrent (excessively low current) and the device 14 checks occurrence of excessively low voltage of the battery B. Each of the devices 12 to 14, when responding, control a signal lamp 15, 16 or 17.

Details of the components illustrated by block symbols in FIG. 3 will be described with reference to FIGS. 4 to 8.

Figure 4:
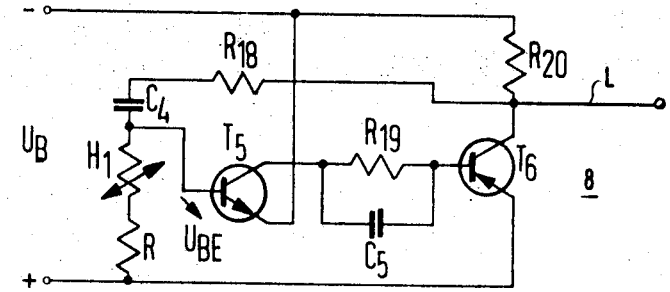
FIG. 4 is the circuit diagram of a time-pulse generator represented by block 8 in FIG. 3.

The keyer or clock-pulse generator denoted by 8 in FIG. 3 may be designed as an astable multivibrator according to FIG. 4 which is equipped with a PNP transistor and an NPN transistor. A clock-pulse generating network of this type has the advantage of requiring only one timing capacitor $C_4$. This is preferable because relatively long intervals of time and consequently large capacitors are needed. The operating voltage $U_B$, such as the voltage of a storage battery, is applied to the above-mentioned bus terminals (+ and −) and causes the two transistors $T_5$ and $T_6$ to be turned off. A thermistor $H_1$ responsive to ambient temperature is connected in series with a resistor R. The timing capacitor $C_4$ is charged by the operating voltage through the thermistor $H_1$ and the series resistor R until the base-emitter voltage of transistor $T_5$ is reached, at which moment this transistor is turned on. Now a current flows into the base of $T_5$. Since the transistor $T_6$ is connected in the collector circuit of $T_5$, the transistor $T_6$ also is turned on, and the capacitor $C_4$ i now commences to be charged with the opposite polarity. When $C_4$ is sufficiently charged in reverse, both transistors are turned off. Now the time timing capacitor $C_4$ discharges through resistors $R_{20}$, $R_{18}$, $H_1$ and R. The time spacing between the pulses varies automatically and continuously in dependence upon ambient temperature under control by the thermistor $H_1$ mounted on the apparatus, for example, in the temperature range of +5° C. to +45° C. The calibrating resistor R permits adjusting the time-temperature curve to desired calibrating values, for example at 25° C. The clock pulse generated by the keyer can be taken off the collector of transistor $T_6$.

The sequence of pulses thus provided by the keyer according to FIG. 4 are employed for controlling the heating current of the welding apparatus and for determining the program duration in accordance with a desired program as exemplified in FIG. 2. For this purpose the pulses are counted in the counter stage 9 (FIG. 3). This counter stage is preferably designed as a chain network of bistable (on—off) stages, preferably equipped with respective controlled rectifiers, which are connected by coupling capacitors with the output lead L supplying the pulses to be counted.

According to another, preferred feature of the invention, the bistable stages of the counting chain network are equipped with thyristors which are normally turned off and upon arrival of pulses sequentially switch to the on-state. In such networks the shape of the pulses to be counted is of minor significance. Furthermore, the feed voltage can be given considerably smaller magnitudes than in conventional counting networks of comparable type.

Figure 5:
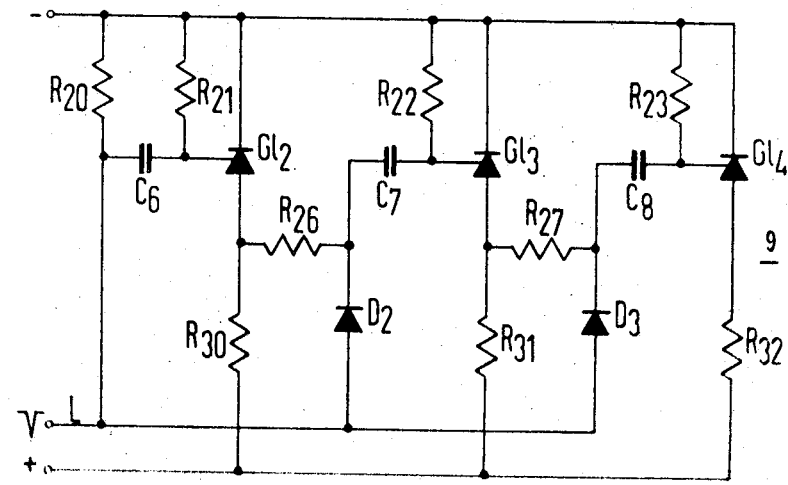
FIG. 5 is the circuit diagram of a counting network of the shift-register type and corresponds to block 9 in FIG. 3.

The counter stage illustrated in FIG. 5 corresponding to the one denoted by 9 in FIG. 3 embodies the just mentioned preferred features of the invention. The network is energized from the same buses (+ and −) as the clock-pulse generator of FIG. 4 and has the resistor $R_{20}$ in common therewith, thus receiving the clock pulses on the input line denoted by L. The counter network comprises three bistable stages whose respective switching components are formed by thyristors $G1_2$, $G1_3$ and $G1_4$. These are connected to the direct-voltage buses in series with respective load resistors $R_{30}$, $R_{31}$ and $R_{32}$ which may be designed as indicating instruments or signal lamps. The control electrodes of thyristors $G1_2$, $G1_3$ and $G1_4$ are connected with the pulse line L through respective coupling capacitors $C_6$, $C_7$ and $C_8$. Diodes $D_2$ and $D_3$ are inserted between the pulse line L and the capacitors $C_7$ and $C_8$ respectively. As mentioned, the pulses are taken from the collector of the transistor $T_6$ in the keyer according to FIG. 4.

Assume that at the starting moment all of the thyristors $G1_2$ to $G1_4$ are turned off. Since the coupling capacitor $C_6$ can discharge through resistors $R_{20}$ and $R_{21}$, the two electrodes of this capacitor have virtually the same potential, whereas the capacitor $C_7$ is charged through resistors $R_{30}$, $R_{26}$, $R_{22}$ and the capacitor $C_8$ is charged through resistors $R_{31}$, $R_{27}$, and $R_{23}$. When now the line L supplies a positive pulse whose magnitude does not exceed the positive charge of those electrodes in capacitors $C_7$ and $C_8$ that are adjacent to the respective diodes $D_2$ and $D_3$, this pulse cannot have an effect upon the capacitors $C_7$ and $C_8$. The pulse, therefore, can act only through the capacitor $C_6$ upon the control electrode of the thyristor $G1_2$ and switches this thyristor to the ON state. Hence a current now flows through the resistor $R_{30}$ and serves to count the first pulse. For example, if the load resistor $R_{30}$ is a signal lamp, it will be lit to indicate, the arrival of the first pulse.

Since the thyristor $G1_2$ is now conducting, the capacitor $C_7$ for the second stage can discharge through resistors $R_{26}$ and $R_{22}$ down to a residual charge corresponding to the voltage drop at the thyristor $G1_2$. As a result, the second stage containing the thyristor $G1_3$ is ready to count the positive pulse next to arrive. The charging condition of the coupling capacitors $C_6$ to $C_8$ memorizes the information as to which stage is to be turned on by the next following pulse. When the next pulse occurs, the thyristor $G1_3$ changes to the ON state so that the capacitor $C_8$ can discharge through resistors $R_{27}$ and $R_{23}$ down to a residual charge corresponding to the voltage drop at thyristor $G1_3$, thus readying the third state of the counting chain. The illustrated chain network is essentially a shift register and can be enlarged by any desired number of additional stages. For clearing the counting chain, the direct voltage of the feed buses is lowered below the value required for the holding current of the transistors.

Other features of the invention concern the circuits for supervising the current in the heater strip or wire interposed between the plastic components to be joined together, and for supervising the welding voltage. Such circuits are accommodated in the unit denoted generally by 11 in FIG. 3. Checking of the battery voltage or other operating voltage is necessary because the operation of the welding equipment, especially the prevention of excessively high current, becomes unreliable if the operating voltage drops below a given minimum value. Of particular significance is the supervision of the current in the heater strip or wire $R_L$ with respect to excessively high or low intensities, such supervision permitting the control of proper servicing and the elimination of any occurring trouble.

Figure 6:
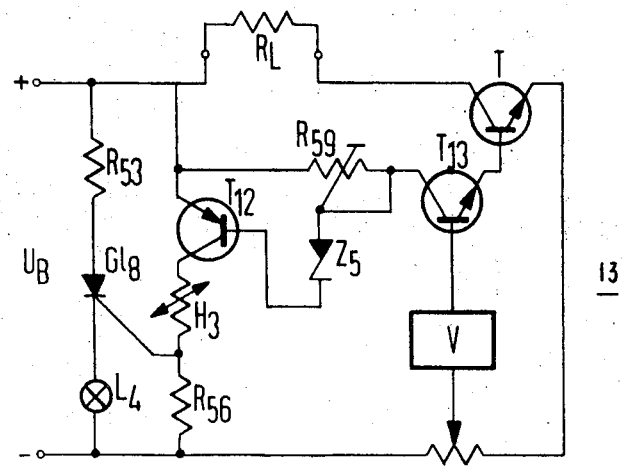
FIG. 6 is the circuit diagram of a checking unit for low current response, applicable for block 13 in FIG. 3.

A preferred circuit design of checking equipment for load-current control denoted by 13 in FIG. 3 is shown in FIG. 6. In this illustration, the current control unit, more fully illustrated in FIG. 1 and described above, is schematically represented by only one of the appertaining transistors T and by the load circuit with the load resistance $R_L$ representative of the heater strip or wire interposed between the parts of synthetic plastic to be joined. The direct-voltage buses denoted by + and − are identical with the correspondingly denoted buses in all of the other illustrations.

The current flowing through a resistor $R_{59}$ drives the base current for the transistors of the current controller 1 according to FIG. 1, of which, as mentioned, only one transistor T is shown in FIG. 6. A transistor $T_{13}$ is turned on in accordance with the operating conditions of the control unit. When the load resistance $R_L$ (heating wire) becomes so large that the adjusted current can no longer flow, the transistor $T_{13}$ controlled by a regulating amplifier V, attempts to pass more current to the base of transistor T, the regulating amplifier V being formed by the components $L_2$, $L_3$, $T_9$ and $T_{14}$ illustrated in FIG. 1. As a result, the transistor $T_{13}$ is driven up to saturation so that the voltage at resistor $R_{59}$ jumps to the possible maximum value. However, if the voltage at $R_{59}$ exceeds the voltage of the Zener diode $Z_5$, the transistor $T_{12}$ is turned on and fires the controlled rectifier $G1_8$ (thyristor) after a time delay determined by the thermistor $H_3$. This change in condition is signaled by the lighting of a lamp $L_4$. The lamp voltage is also employed to trigger a circuit breaker (not shown) for disconnecting the welding apparatus.

Figure 7:
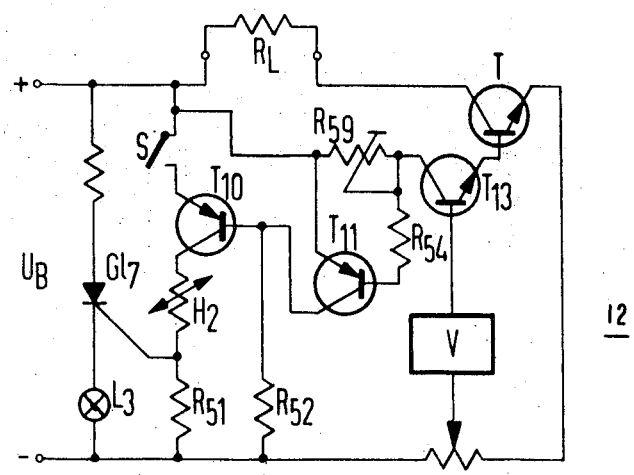
FIG. 7 is the circuit diagram of a checking unit for overload-current control, applicable for block 12 in FIG. 3.

A preferred embodiment of the unit (12 in FIG. 3) for overload control is shown in FIG. 7. This embodiment is based upon the consideration that if the current-controlling transistors T (FIGS. 1,6) are destroyed, no base current will flow in these transistors. In such an event, therefore, the voltage of resistor $R_{59}$ (FIGS. 6, 7) will disappear. Hence the overload control checks only for occurrence of voltage at resistor $R_{59}$. When no current flows through $R_{59}$, the transistor $T_{11}$ is turned off and the transistor $T_{10}$ is turned on, provided the control switch S is closed. After a delay determined by the thermistor $H_2$, the controlled rectifier $G1_7$ is fired. The signal lamp $L_3$ indicates overload current. If desired, one of the two lamps, $L_3$, $L_4$ may be omitted and the lamp-side electrodes of the thyristors $G1_7$ and $G1_8$ be connected with each other.

When the battery voltage drops below the safe minimum, the proper functioning of the supervision for excessively low current becomes unreliable. Under such conditions, a sufficiently high voltage can no longer appear at the resistor $R_{59}$ and hence cannot cause breakthrough of the Zener diode $Z_5$. It is therefore also necessary to check the operating voltage. For this purpose, and in accordance with the preferred embodiment illustrated in FIG. 8, a signal lamp $L_1$ is controlled to start blinking when the operating voltage $U_H$ drops below a given value, for example below 10.8 to 10.4 v.

The low-voltage control circuit of FIG. 8 is essentially a modified astable multivibrator. A Zener diode $Z_1$ blocks a transistor $T_1$ at high battery voltage because then a positive potential is placed upon its emitter. Under such normal conditions, the second transistor $T_2$ is turned on and the lamp $L_1$ will be continuously lighted. If the battery voltage drops below a value determined by the Zener diode $Z_1$, the multivibrator will flip periodically and the signal lamp $L_1$ commences to blink.

FIGS. 9 and 10 conjointly show a straight line diagram of the complete circuitry for a plastics welding apparatus according to the invention embodying all of the details separately described above with reference to the preceding illustrations. A 12-volt battery is to be connected to the bus terminals IV and V (FIG. 9). The transistors $T_1$, $T_2$ and the appertaining other circuit components constitute the stage for low-voltage supervision shown in FIG. 8. The transistor $T_{12}$ in coaction with the controllable rectifier $G1_8$ and the appertaining components constitute the stage for low-current control described above with reference to FIG. 6. The transistors $T_{10}$ and $T_{11}$ with the controllable rectifier $G1_7$ operate in an overload-current control network as shown in FIG. 7. The circuitry according to FIG. 9 is supplemented by the regulating circuit shown in FIG. 10 by interconnecting the respective terminals denoted by I to V in both illustrations. The regulating circuit of FIG. 10 is a component of the above-described current control unit represented in FIG. 1.

Referring first to FIG. 10 and its relation to FIG. 1, it will be noted that the regulating control network of FIG. 10 comprises four parallel connected transistors $T_{14}$ to $T_{17}$ in the load circuit of the heating strip represented by a load resistor $R_L$. A lamp $L_2$ (FIGS. 1 and 9) is connected parallel to the measuring resistor $R_M$ between the terminals IV and III. The lamp $L_2$ acts upon a photoresistor 3 which controls the transistor $T_9$ through the Zener diode $Z_4$. The control voltage amplified in transistor $T_9$ acts through terminal 1 upon amplifying transistors $T_{13}a$ and $T_{13}$ which control the heating current flowing through the transistors $T_{14}$ to $T_{19}$.

The transistors $T_3$ and $T_4$ (FIGS. 1 and 9) coacting with the Zener diode $Z_3$ provide for voltage regulation which secures a constant voltage for the pulse generator comprising the transistors $T_5$ and $T_6$ (FIGS. 4 and 9). The same constant voltage energizes the counter chain network (shift register) with the controllable rectifiers $Gl_2$ to $Gl_5$ described above with reference to FIG. 5. The counter network is switched forward by the transistor $T_6$ under control by the sequence of pulse regulated in dependence upon the ambient temperature sensed by the thermistor $H_1$. Thus, the network controls through the diodes $D_8$, $D_9$ and the transistors $T_7$, $T_8$ the heating-current steps in accordance with the program illustrated in FIG. 2, this control performance being due to the fact that the resistors $R_{46}$ and $R_{47}$ or the resistors $R_{44}$ to $R_{47}$ are shunted by the respective transistors when the latter are turned on.

A buzzer $Sch$ can be actuated through the diodes $D_5$, $D_6$ and $D_7$ to operate as an acoustical checking signal.

The regulating current-control device shown in FIG. 1 performs the current regulation by varying the internal resistance of the control stage 1. For this purpose, the transistors of the control stage ares are subjected to the share of voltage to be made ineffective. According to an advantageous modification, these transistors or one of them, may be operated as a switch which periodically makes and breaks the current through the heating resistance $R_1$. By suitably selecting the time relation of the ON intervals to the OFF intervals, a power control for the load $R_L$ virtually free of losses can thus be obtained in accordance with the principle of intermittent time-controlled pulse sequence. If desired, the entire load current I can thus be intermittently controlled with the aid of a single transistor.

To those skilled in the art it will be obvious upon a study of this disclosure that various other modifications are applicable and hence that the invention may be given embodiments other than particularly illustrated and described herein, without departing from the essential features of the invention and within the scope of the claims annexed hereto.

I claim:

1. Apparatus for regulating an electric current flowing through a load, comprising a load circuit including a load member whose cure current is to be regulated, feed-voltage supply means connected to said load circuit for passing said current through said member, current control means connected in said load circuit for controlling said current, a voltage-drop resistor serially connected in said load circuit to provide a pilot voltage indicative of said load current, a light source connected to said resistor to be controlled in dependence upon said pilot voltage, a voltage divider having a photoresistor subjected to the light of said source, constant direct-voltage means connected to said voltage divider whereby said photoresistor furnishes a signal voltage, and circuit means connecting said photoresistor to said current control means for controlling said control means to regulate said load current in dependence upon said signal voltage.

2. In apparatus according to claim 1, said voltage-drop resistor in said load circuit having a resistance of a lower order of magnitude than said load member.

3. In apparatus according to claim 1, said current control means comprising control transistors connected in parallel relation to each other and in series relation to said load member, said control transistors having respective base electrodes, said circuit means comprising a regulating transistor having a base circuit connected to said photoresistor and having an output circuit connected to said base electrodes for controlling said control transistors to regulate said load current.

4. Apparatus for controlling the heating current for welding of thermoplastic parts by heat and pressure with the aid of an interposed heater strip member traversed by the current during welding and remaining embedded in the weld, comprising feed-voltage supply means, a load circuit serially including said welding heater strip member when in operation and connected to said supply means for passing heating current through said member, current control means connected in said load circuit and having means for regulating said heating current to maintain it substantially at a predetermined value independently of the feed voltage and the resistance of said member, and a timing monitor connected to said current control means and having sequencing switch means for incrementally reducing said heating current in accordance with a given time sequence and for discontinuing said load current at the termination of said sequence, said heater strip member being of uniform structure and having a uniform ohmic resistance R per unit length so that the amount of heat required per unit length to produce the weld is determined by the power loss $I^2R$ and therefore depends only upon the adjustment of the current I thereby being independent of the length and total resistance of said heater strip.

5. In apparatus according to claim 4, said monitor comprising a pulse generator constituted by a multivibrator network, and a pulse-counting chain network connected to said multivibrator network and having respective progressive counter stages determining the amount of current flowing through said heating member.

6. In apparatus according to claim 5, said pulse-counting network comprising chain-connected bistable stages having respective thyristors of which each has a firing electrode, said pulse generator having a pulse output line, coupling capacitors connecting said line to said respective firing electrodes for sequentially switching said thyristors to the ON state upon arrival of sequential pulses respectively.

7. In apparatus according to claim 5, said pulse generator comprising a thermistor subject to ambient temperature and connected in said multivibrator network for varying the pulse sequence of said multivibrator network so as to secure at lower ambient temperatures a slower pulse sequence than at high temperatures.

8. Apparatus according to claim 2, comprising condition-sensing control means responsive to departure of said heating current from a given intensity range.

9. Apparatus for regulating an electric current flowing through a load, comprising a load circuit including a load member whose current is to be regulated, feed-voltage supply means connected to said load circuit for passing said current through said member, current control means connected in said load circuit for controlling said current, said current control means comprising control transistors connected in parallel relation to each other and in series relation to said load member, said control transistors having respective base electrodes, a voltage-drop resistor serially connected in said load circuit to provide a pilot voltage indicative of said load current, a light source connected to said resistor to be controlled in dependence upon said pilot voltage, a voltage divider having a photoresistor subjected to the light of said source, constant direct-voltage means connected to said voltage divider whereby said photoresistor furnishes a signal voltage, and circuit means connecting said photoresistor to said current control means for controlling said control means to regulate said load current in dependence upon said signal voltage, said circuit means comprising a regulating transistor having a base circuit connected to said photoresistor and having an output circuit connected to said base electrodes for controlling said control transistors to regulate said load current.

10. Apparatus for controlling the heating current for welding of thermoplastic parts by heat and pressure with the aid of an interposed heater strip member traversed by the current during welding and remaining embedded in the weld, comprising feed-voltage supply means, a load circuit serially including said welding heater strip member when in operation and connected to said supply means for passing heating current through said member, current control means connected in said load circuit and having means for regulating said heating current to maintain it substantially at a predetermined value independently of the feed-voltage and the resistance of said member, and a timing monitor connected to said current control means and having sequencing switch means for incrementally reducing said heating current in accordance with a given time sequence and for discontinuing said load current at the termination of said sequence.

11. Apparatus for controlling the heating current for welding of thermoplastic parts by heat and pressure with the aid of an interposed heater strip member of arbitrary length traversed by the current during welding and remaining embedded in the weld, comprising feed-voltage supply means, a load circuit serially including said welding heater strip member when in operation and connected to said supply means for passing heating current through said member, and current control means connected in said load circuit and having means for regulating said heating current to maintain it substantially at a predetermined value independently of the feed-voltage and the resistance of said member, said heater strip member being of uniform structure and having a uniform ohmic resistance R per unit length so that the amount of heat required per unit length to produce the weld is determined by the power loss $I^2R$ and therefore depends only upon the adjustment of the current I and is independent of the length and total resistance of said heater strip.

12. In apparatus according to claim 11, said monitor comprising a pulse generator constituted by a multivibrator network, and a pulse-counting chain network connected to said multivibrator network and having respective progressive counter stages determining the amount of current flowing through said heating member.

13. In apparatus according to claim 12, said pulse-counting network comprising chain-connected bistable stages having respective thyristors of which each has a firing electrode, said pulse generator having a pulse output line, coupling capacitors connecting said line to said respective firing electrodes for sequentially switching said thyristors to the ON state upon arrival of sequential pulses respectively.

14. In apparatus according to claim 12, said pulse generator comprising a thermistor subject to ambient temperature and connected in said multivibrator network for varying the pulse sequence of said multivibrator network so as to secure at lower ambient temperatures a slower pulse sequence than at higher temperatures.